(12) United States Patent
Ramakrishnan et al.

(10) Patent No.: US 10,394,393 B2
(45) Date of Patent: Aug. 27, 2019

(54) COMPENSATING FORCE BASELINE ARTIFACTS IN A CAPACITIVE SENSOR

(71) Applicant: SYNAPTICS INCORPORATED, San Jose, CA (US)

(72) Inventors: Shubha Ramakrishnan, San Jose, CA (US); Adam L. Schwartz, Redwood City, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 169 days.

(21) Appl. No.: 15/199,421

(22) Filed: Jun. 30, 2016

(65) Prior Publication Data

US 2017/0102800 A1   Apr. 13, 2017

Related U.S. Application Data

(60) Provisional application No. 62/239,837, filed on Oct. 9, 2015.

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01); *G06F 3/0418* (2013.01)

(58) Field of Classification Search
CPC ....... G06F 3/044; G06F 3/0416; G06F 3/0418
See application file for complete search history.

(56) References Cited

U.S. PATENT DOCUMENTS

| 7,047,818 B2 | 5/2006 | Dallenbach et al. |
| 7,148,882 B2 | 12/2006 | Kamrath et al. |
| 7,158,122 B2 | 1/2007 | Roberts |
| 7,681,432 B2 | 3/2010 | Hay et al. |
| 7,698,084 B2 | 4/2010 | Soss |
| 7,784,366 B2 | 8/2010 | Daverman et al. |

(Continued)

FOREIGN PATENT DOCUMENTS

WO   WO-2014035479 A2   3/2014

OTHER PUBLICATIONS

PCT/US2016/047079, International Search Report and Written Opinion dated Nov. 17, 2016, consists of 11 pages.

*Primary Examiner* — Temesghen Ghebretinsae
*Assistant Examiner* — Yaron Cohen
(74) *Attorney, Agent, or Firm* — Paradice and Li LLP

(57) ABSTRACT

An example processing system for a capacitive input device includes sensor circuitry configured to drive a plurality of sensor electrodes with capacitive sensing signals over time to acquire capacitive values of a plurality of capacitive frames. The processing system includes a determination module configured to analyze a first capacitive frame of the plurality of capacitive frames to identify a force event by detecting that a rate of change of a first capacitive value in the first capacitive frame exceeds a first threshold. The determination module is configured to determine a change in capacitance between the first capacitive value and a baseline value, and analyze a second capacitive frame of the plurality of capacitive frames acquired after the force event to adjust the baseline value responsive to a difference between the baseline value and a second capacitive value in the second capacitive frame falling below a second threshold.

17 Claims, 7 Drawing Sheets

(56) References Cited

U.S. PATENT DOCUMENTS

| | | |
|---|---|---|
| 8,339,286 B2 | 12/2012 | Cordeiro |
| 8,607,651 B2 | 12/2013 | Eventoff |
| 8,768,560 B2 | 7/2014 | Willis |
| 9,024,907 B2 | 5/2015 | Bolender |
| 9,057,653 B2 | 6/2015 | Schediwy et al. |
| 9,182,856 B2 | 11/2015 | Logan et al. |
| 2002/0158637 A1 | 10/2002 | Warmack et al. |
| 2006/0029386 A1 | 2/2006 | Ogawara et al. |
| 2007/0229464 A1 | 10/2007 | Hotelling et al. |
| 2008/0167832 A1 | 7/2008 | Soss |
| 2012/0319987 A1 | 12/2012 | Woo |
| 2012/0327025 A1 | 12/2012 | Huska et al. |
| 2013/0073142 A1 | 3/2013 | Hergesheimer et al. |
| 2013/0106715 A1* | 5/2013 | Shahparnia ......... G06F 3/03545 345/173 |
| 2013/0106794 A1 | 5/2013 | Logan et al. |
| 2014/0049501 A1 | 2/2014 | Santos et al. |
| 2014/0085213 A1 | 3/2014 | Huppi et al. |
| 2014/0125623 A1* | 5/2014 | Atkinson ................ G06F 3/044 345/174 |
| 2014/0278173 A1 | 9/2014 | Elia et al. |
| 2014/0345358 A1 | 11/2014 | White et al. |

\* cited by examiner

COMPENSATING FORCE BASELINE ARTIFACTS IN A CAPACITIVE SENSOR

CROSS-REFERENCE TO RELATED APPLICATIONS

This application claims priority to U.S. Provisional Patent Application Ser. No. 62/239,837, filed Oct. 9, 2015, which is incorporated by reference herein in its entirety.

BACKGROUND

Field of the Disclosure

Embodiments of disclosure generally relate to capacitive sensors and, more particularly, compensating force baseline artifacts in a capacitive sensor.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

Techniques for compensating force baseline artifacts in a capacitive sensor are described. In an embodiment, a processing system for a capacitive input device includes sensor circuitry configured to drive a plurality of sensor electrodes with capacitive sensing signals over time to acquire capacitive values of a plurality of capacitive frames. The processing system further includes a determination module, coupled to the sensor circuitry, configured to analyze a first capacitive frame of the plurality of capacitive frames to identify a force event by detecting that a rate of change of a first capacitive value in the first capacitive frame exceeds a first threshold. The determination module is further configured to determine a change in capacitance between the first capacitive value and a baseline value. The determination module is further configured to analyze a second capacitive frame of the plurality of capacitive frames acquired after the force event to adjust the baseline value responsive to a difference between the baseline value and a second capacitive value in the second capacitive frame falling below a second threshold.

In another embodiment, an input device includes a plurality of sensor electrodes disposed in a sensing region and a processing system coupled to the plurality of sensor electrodes. The processing system includes sensor circuitry configured to drive the plurality of sensor electrodes with capacitive sensing signals over time to acquire capacitive values of a plurality of capacitive frames. The processing system further includes a determination module, coupled to the sensor circuitry, configured to analyze a first capacitive frame of the plurality of capacitive frames to identify a force event by detecting that a rate of change of a first capacitive value in the first capacitive frame exceeds a first threshold. The determination module is further configured to determine a change in capacitance between the first capacitive value and a baseline value. The determination module is further configured to analyze a second capacitive frame of the plurality of capacitive frames acquired after the force event to adjust the baseline value responsive to a difference between the baseline value and a second capacitive value in the second capacitive frame falling below a second threshold.

A method of capacitive sensing includes driving a plurality of sensor electrodes with capacitive sensing signals over time to acquire capacitive values of a plurality of capacitive frames. The method further includes analyzing a first capacitive frame of the plurality of capacitive frames to identify a force event by detecting that a rate of change of a first capacitive value in the first capacitive frame exceeds a first threshold. The method further includes determining a change in capacitance between the first capacitive value and a baseline value. The method further includes analyzing a second capacitive frame of the plurality of capacitive frames acquired after the force event to adjust the baseline value responsive to a difference between the baseline value and a second capacitive value in the second capacitive frame falling below a second threshold.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
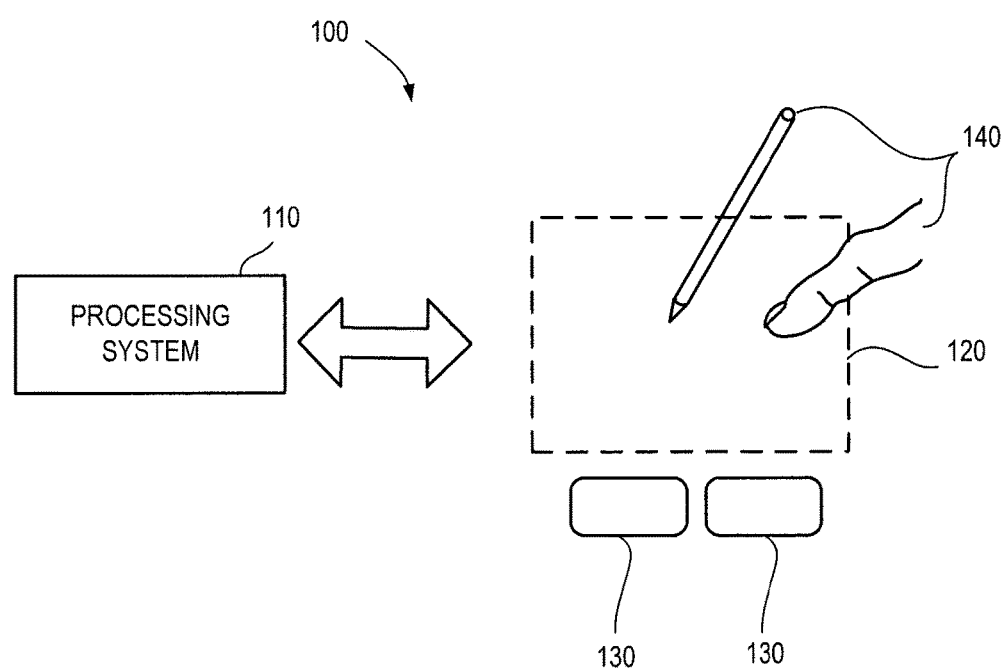
FIG. 1 is a block diagram of an exemplary input device, according to one embodiment described herein.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include $I^2C$, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
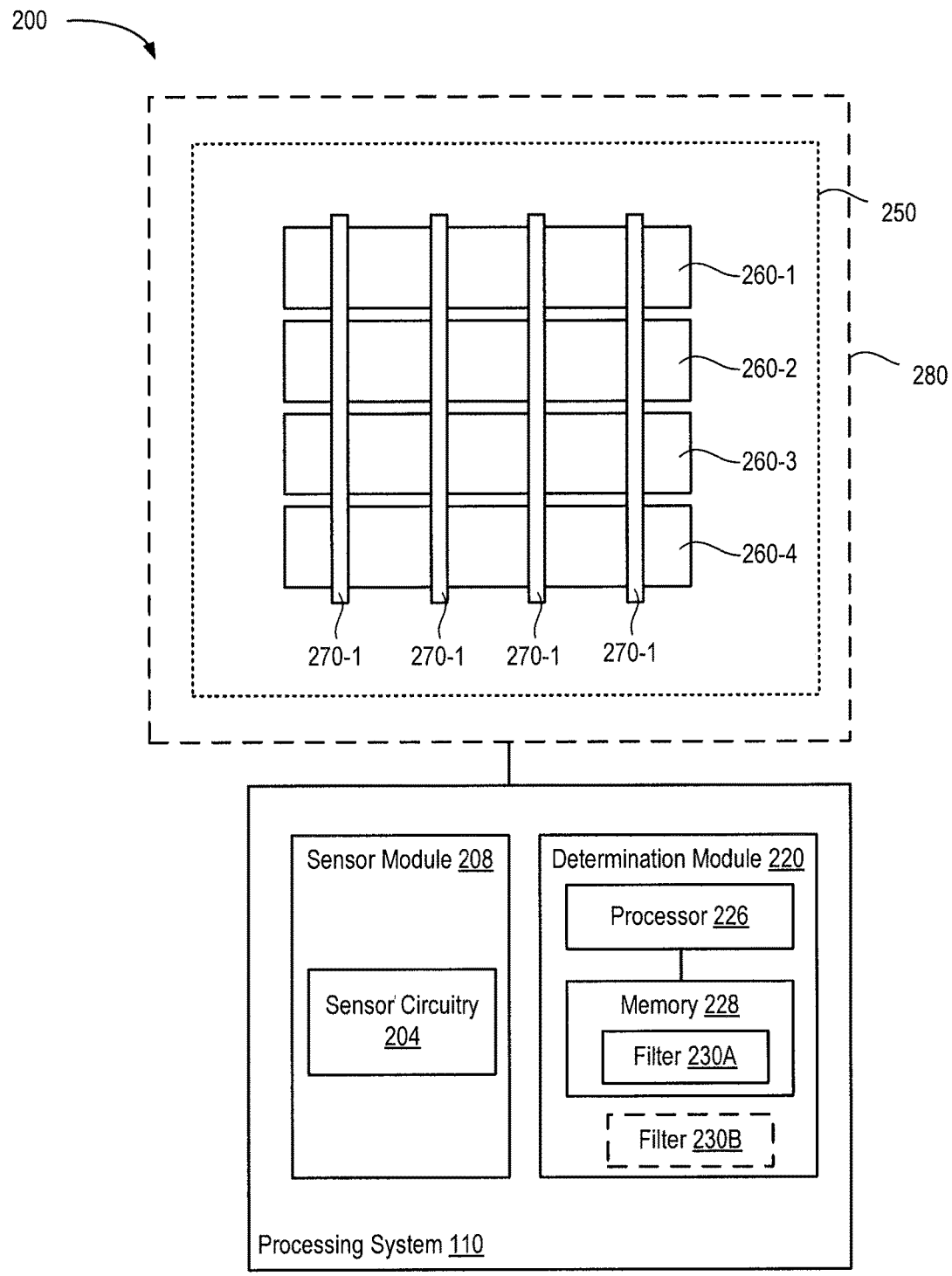
FIG. 2 is a block diagram depicting a capacitive sensing device of an input device according to some embodiments.

FIG. 2 is a block diagram depicting a capacitive sensing device 200 of the input device 100 according to some embodiments. For clarity of illustration and description, FIG. 2 shows the sensing elements of the capacitive sensing device 200 in a pattern of simple rectangles and does not show various components, such as various interconnects between the sensing elements and the processing system 110. An electrode pattern 250 comprises a first plurality of sensor electrodes 260 (260-1, 260-2, 260-3, ... 260-*n*), and a second plurality of sensor electrodes 270 (270-1, 270-2, 270-3, ... 270-*m*) disposed over the first plurality of electrodes 260. In the example shown, n=m=4, but in general n and m are each positive integers and not necessarily equal to each other. In various embodiments, the first plurality of sensor electrodes 260 are operated as a plurality of transmitter electrodes (referred to specifically as "transmitter electrodes 260"), and the second plurality of sensor electrodes 270 are operated as a plurality of receiver electrodes (referred to specifically as "receiver electrodes 270"). In another embodiment, one plurality of sensor electrodes may be configured to transmit and receive and the other plurality of sensor electrodes may also be configured to transmit and receive. Further processing system 110 can receive resulting signals with one or more sensor electrodes of the first and/or second plurality of sensor electrodes while the one or more sensor electrodes are modulated with absolute capacitive sensing signals. The first plurality of sensor electrodes 260, the second plurality of sensor electrodes 270, or both can be disposed within the sensing region 120. The electrode pattern 250 is coupled to the processing system 110 through routing traces (discussed below). While a "bars-and-stripes" type electrode pattern is described as an example, it is to be understood that embodiments described herein can be used with other types of sensor electrode patterns, such as "matrix" patterns and the like.

The first plurality of electrodes 260 and the second plurality of electrodes 270 are typically ohmically isolated from each other. That is, one or more insulators separate the first plurality of electrodes 260 and the second plurality of electrodes 270 and prevent them from electrically shorting to each other. In some embodiments, the first plurality of electrodes 260 and the second plurality of electrodes 270 are separated by insulative material disposed between them at cross-over areas; in such constructions, the first plurality of electrodes 260 and/or the second plurality of electrodes 270 can be formed with jumpers connecting different portions of the same electrode. In some embodiments, the first plurality of electrodes 260 and the second plurality of electrodes 270 are separated by one or more layers of insulative material. In such embodiments, the first plurality of electrodes 260 and the second plurality of electrodes 270 can be disposed on separate layers of a common substrate. In some other embodiments, the first plurality of electrodes 260 and the second plurality of electrodes 270 are separated by one or more substrates; for example, the first plurality of electrodes 260 and the second plurality of electrodes 270 can be disposed on opposite sides of the same substrate, or on different substrates that are laminated together. In some embodiments, the first plurality of electrodes 260 and the second plurality of electrodes 270 can be disposed on the same side of a single substrate.

The areas of localized capacitive coupling between the first plurality of sensor electrodes 260 and the second plurality sensor electrodes 270 may be form "capacitive pixels" of a "capacitive image" (also referred to as a "capacitive frame"). The capacitive coupling between sensor electrodes of the first and second pluralities 260 and 270 changes with the proximity and motion of input objects in the sensing region 120. Further, in various embodiments, the localized capacitive coupling between each of the first plurality of sensor electrodes 260 and the second plurality of sensor electrodes 270 and an input object may be termed "capacitive pixels" of a "capacitive image." In some embodiments, the localized capacitive coupling between each of the first plurality of sensor electrodes 260 and the second plurality of sensor electrodes 270 and an input object may be termed "capacitive measurements" of "capacitive profiles."

The processing system 110 can include a sensor module 208 having sensor circuitry 204. The sensor circuitry 204 operates the electrode pattern 250 to receive resulting signals from sensor electrodes using a capacitive sensing signal having a sensing frequency. The processing system 110 can include a determination module 220 configured to determine capacitive measurements from the resulting signals. The determination module 220 can include processor circuitry 226, such as a digital signal processor (DSP), microprocessor, or the like. The determination module 220 can include memory 228 configured to store software and/or firmware configured for execution by processor circuitry 226 to implement various functions, such as determining object position from the resulting signals. Alternatively, some or all of the functions of the determination module 220 can be implemented entirely in hardware (e.g., using integrated circuitry). The determination module 220 can track changes in capacitive measurements to detect input object(s) in the sensing region 120. The processing system 110 can include other modular configurations, and the functions performed by the sensor module end 208 and the determination module 220 can, in general, be performed by one or more modules or circuits in the processing system 110. The processing system 110 can include other modules and circuits, and can perform other functions as described in some embodiments below.

The processing system 110 can operate in absolute capacitive sensing mode or transcapacitive sensing mode. In absolute capacitive sensing mode, receiver(s) in the sensor circuitry 204 measure voltage, current, or charge on sensor electrode(s) in the electrode pattern 250 while the sensor electrode(s) are modulated with absolute capacitive sensing signals to generate the resulting signals. The processing module 220 generates absolute capacitive measurements from the resulting signals. The processing module 220 can track changes in absolute capacitive measurements to detect input object(s) in the sensing region 120.

In transcapacitive sensing mode, transmitter(s) in the sensor circuitry 204 drive one or more of the first plurality of electrodes 260 with the capacitive sensing signal (also referred to as a transmitter signal or modulated signal in the transcapacitive sensing mode). Receiver(s) in the sensor circuitry 204 measure voltage, current, or charge on one or more of the second plurality of electrodes 270 to generate the resulting signals. The resulting signals comprise the effects of the capacitive sensing signal and input object(s) in the sensing region 120. The processing module 220 generates transcapacitive measurements from the resulting signals. The processing module 220 can track changes in transcapacitive measurements to detect input object(s) in the sensing region 120.

In some embodiments, the processing system 110 "scans" the electrode pattern 250 to determine capacitive measurements. In the transcapacitive sensing mode, the processing system 110 can drive the first plurality of electrodes 260 to transmit transmitter signal(s). The processing system 110 can operate the first plurality of electrodes 260 such that one transmitter electrode transmits at one time, or multiple transmitter electrodes transmit at the same time. Where multiple transmitter electrodes transmit simultaneously, these multiple transmitter electrodes may transmit the same transmitter signal and effectively produce a larger transmitter electrode, or these multiple transmitter electrodes may transmit different transmitter signals. For example, multiple transmitter electrodes may transmit different transmitter signals according to one or more coding schemes that enable their combined effects on the resulting signals of the second plurality of electrodes 270 to be independently determined. In the absolute capacitive sensing mode, the processing system 110 can receiving resulting signals from one sensor electrode 260, 270 at a time, or from a plurality of sensor electrodes 260, 270 at a time. In either mode, the processing system 110 can operate the second plurality of electrodes 270 singly or collectively to acquire resulting signals. In absolute capacitive sensing mode, the processing system 110 can concurrently drive all electrodes along one or more axes. In some examples, the processing system 110 can drive electrodes along one axis (e.g., along the first plurality of sensor electrodes 260) while electrodes along another axis are driven with a shield signal, guard signal, or the like. In some examples, some electrodes along one axis and some electrodes along the other axis can be driven concurrently.

In the transcapacitive sensing mode, the processing system 110 can use the resulting signals to determine capacitive measurements at the capacitive pixels. A set of measurements from the capacitive pixels form a "capacitive image" (also "capacitive frame") representative of the capacitive measurements at the pixels. The processing system 110 can acquire multiple capacitive images over multiple time periods, and can determine differences between capacitive images to derive information about input in the sensing region 120. For example, the processing system 110 can use successive capacitive images acquired over successive periods of time to track the motion(s) of one or more input objects entering, exiting, and within the sensing region 120.

In absolute capacitive sensing mode, the processing system 110 can use the resulting signals to determine capacitive measurements along an axis of the sensor electrodes 260 and/or an axis of the sensor electrodes 270. A set of such measurements forms a "capacitive profile" representative of the capacitive measurements along the axis. The processing system 110 can acquire multiple capacitive profiles along one or both of the axes over multiple time periods and can determine differences between capacitive profiles to derive information about input in the sensing region 120. For example, the processing system 110 can use successive capacitive profiles acquired over successive periods of time to track location or proximity of input objects within the sensing region 120. In other embodiments, each sensor can be a capacitive pixel of a capacitive image and the absolute capacitive sensing mode can be used to generate capacitive image(s) in addition to or in place of capacitive profiles.

The baseline capacitance of the input device 100 is the capacitive image or capacitive profile associated with no input object in the sensing region 120. The baseline capacitance changes with the environment and operating conditions, and the processing system 110 can estimate the baseline capacitance in various ways. For example, in some embodiments, the processing system 110 takes "baseline images" or "baseline profiles" when no input object is determined to be in the sensing region 120, and uses those baseline images or baseline profiles as estimates of baseline capacitances. The processing module 220 can account for the baseline capacitance in the capacitive measurements and thus the capacitive measurements can be referred to as "delta capacitive measurements". Thus, the term "capacitive measurements" as used herein encompasses delta-measurements with respect to a determined baseline.

In some touch screen embodiments, at least one of the first plurality of sensor electrodes 260 and the second plurality of sensor electrodes 270 comprise one or more display electrodes of a display device 280 used in updating a display of a display screen, such as one or more segments of a "Vcom" electrode (common electrodes), gate electrodes, source electrodes, anode electrode and/or cathode electrode. These display electrodes may be disposed on an appropriate display screen substrate. For example, the display electrodes may be disposed on a transparent substrate (a glass substrate, TFT glass, or any other transparent material) in some display screens (e.g., In Plane Switching (IPS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. The display electrodes can also be referred to as "common electrodes," since the display electrodes perform functions of display updating and capacitive sensing. In various embodiments, each sensor electrode of the first and/or second plurality of sensor electrodes 260 and 270 comprises one or more common electrodes. In other embodiments, at least two sensor electrodes of the first plurality of sensor electrodes 260 or at least two sensor electrodes of the second plurality of sensor electrodes 270 may share at least one common electrode. Furthermore, in one embodiment, both the first plurality of sensor electrodes 260 and the second plurality electrodes 270 are disposed within a display stack on the display screen substrate. An example display stack is described below with respect to FIG. 3. Additionally, at least one of the sensor electrodes 260, 270 in the display stack may comprise a common electrode. However, in other embodiments, only the first plurality of sensor electrodes 260 or the second plurality of sensor electrodes 270 (but not both) are disposed within the display stack, while other sensor electrodes are outside of the display stack (e.g., disposed on an opposite side of a color filter glass).

In an embodiment, the processing system 110 comprises a single integrated controller, such as an application specific integrated circuit (ASIC), having the sensor module 208, the determination module 220, and any other module(s) and/or circuit(s). In another embodiment, the processing system 110 can include a plurality of integrated circuits, where the sensor module 208, the determination module 220, and any other module(s) and/or circuit(s) can be divided among the integrated circuits. For example, the sensor module 208 can be on one integrated circuit, and the determination module 220 and any other module(s) and/circuit(s) can be one or more other integrated circuits. In some embodiments, a first portion of the sensor module 208 can be on one integrated circuit and a second portion of the sensor module 208 can be on second integrated circuit. In such embodiments, at least one of the first and second integrated circuits comprises at least portions of other modules, such as a display driver module and/or a display driver module.

In some embodiments, the processing system 110 is further configured to determine force information for an input object. The processing system 110 can determine the force information in response to capacitive measurements obtained from sensor electrodes integrated within a display device. As described further below, a input surface of the input device 100 can bend in response to a force applied by an input object. The bending of the input surface results in a deflection from equilibrium of at least a portion of the sensor electrodes. The deflection of sensor electrode(s) due to the applied force results in a change in the capacitive measurements. The force information can include a "force images", "force profiles", or a scalar force value, depending on the configuration of the sensor electrodes. For example, capacitive measurements derived from the sensor electrode pattern 250 can be used to generate force images or force scalar values. The force information can be combined with position information to determine both position of an input object and a force applied by the input object. In another embodiment, the magnitude of the force can be measured to determine a scalar force value. The scalar force value can be combined with position information to generate a force image or a force profile.

Figure 3:
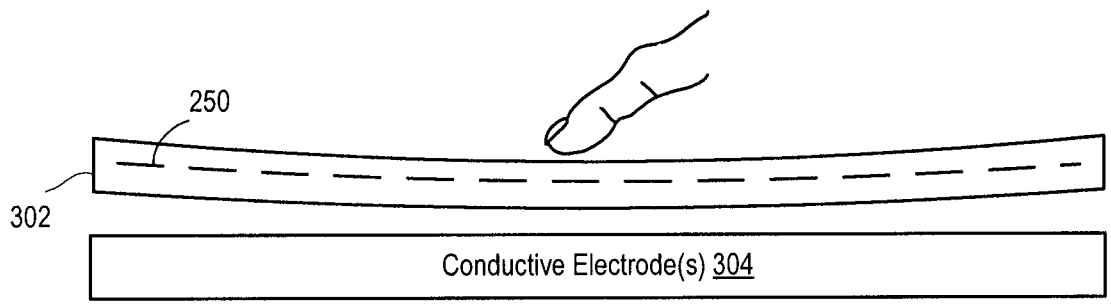
FIG. 3 is a schematic cross-section depicting a force applied to an input device by an input object according to an embodiment.

FIG. 3 is a schematic cross-section depicting a force applied to the input device 100 by an input object according to an embodiment. The input object (e.g., a finger) applies a force to the input surface (not shown in FIG. 3), which in turn bends a substrate 302 having at least a portion of the sensor electrode pattern 250. The sensor electrodes deflect toward conductive electrode(s) 304. The conductive electrode(s) 304 can be driven with a reference voltage, such as electrical ground. As some of the sensor electrodes move closer to the conductive electrode(s) 304, the measured capacitance changes. The processing system 110 can measure the changes in capacitance to sense force applied by the input object.

Figure 4:
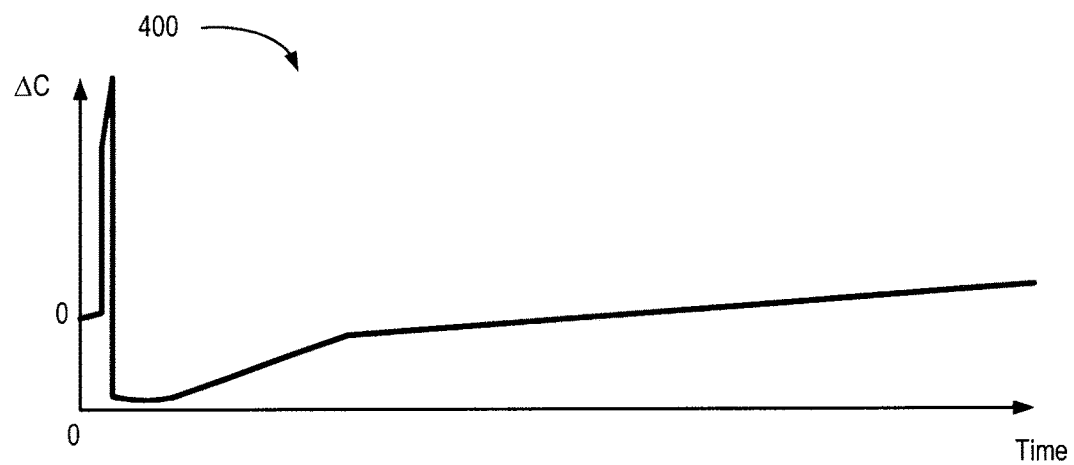
FIG. 4 is a graph illustrating an example response measured from a sensor electrode pattern in response to a single force event.

FIG. 4 is a graph 400 illustrating an example response measured from the sensor electrode pattern 250 in response to a single force event. The response can be measured from a single sensor electrode or be some combination of measurements from multiple sensor electrodes. The graph 400 includes a Y-axis representing a change in capacitance, and an X-axis representing time. When the force is applied, the response increases (i.e., the measured change in capacitance increases), as illustrated by the peak in the response. Upon removal of the force, the response drops below the level prior to the applied force and then settles back to its quiescent value (e.g., near 0). The settling time is much longer than the duration of the force event. For example, the duration of the force event can be on the order of seconds, while the duration of the settling time can be on the order of minutes.

Figure 5:
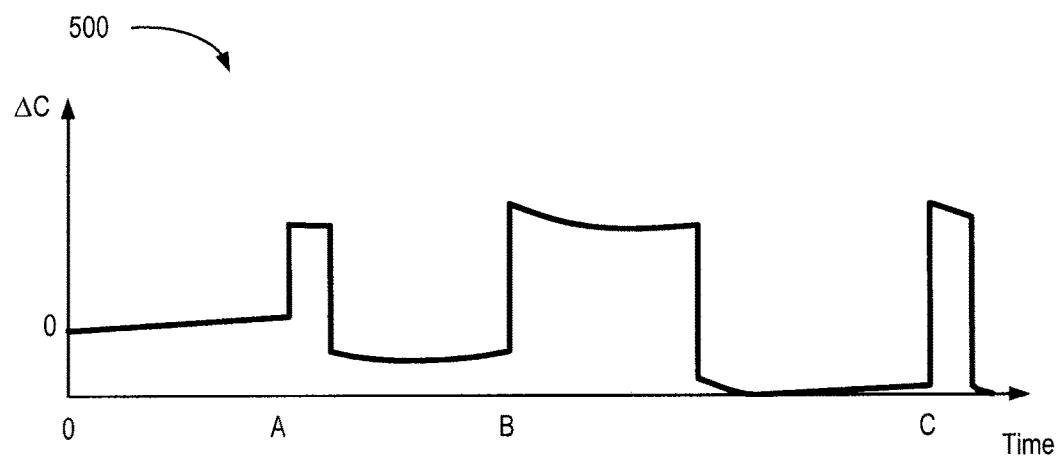
FIG. 5 shows a graph illustrating an example response measured from a sensor electrode pattern in response to three force events.
Figure 5:
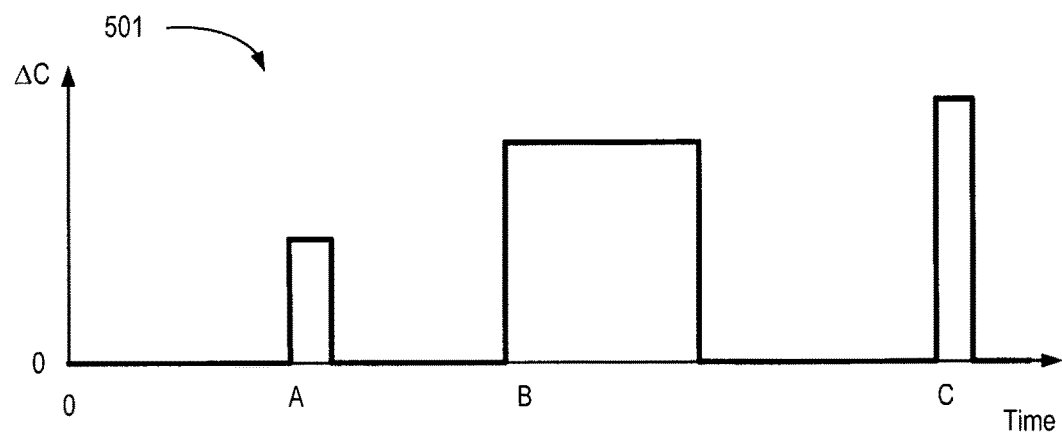

FIG. 5 shows a graph 500 illustrating an example response measured from the sensor electrode pattern 250 in response to three force events. The response can be measured from a single sensor electrode or be some combination of measurements from multiple sensor electrodes. The graph 500 includes a Y-axis representing a change in capacitance, and an X-axis representing time. As shown, the quiescent level of the response changes after a force event. At time indicated by point A, the quiescent level is approximately 0. At the start of the next force event, at a time indicated by point B, the quiescent level is less than 0. At the start of the third force event, at a time indicated by a point C, the quiescent level is less than the quiescent level at point B. As such, a fixed threshold approach to detecting the occurrence of force events can fail. The magnitudes of the second and third force events may be larger than the first response, but this is not reflected in the response due to the changing quiescent level.

Returning to FIG. 2, the determination module 220 includes a filter to compensate for baseline artifacts in force sensing. In an embodiment, a filter 230A is implemented using software or firmware that is stored in the memory 228 and executed by the processor 226. In another embodiment, a filter 230B comprises a circuit. In general, the determination module 220 includes a filter 230 for compensating for baseline artifacts in force sensing.

Figure 6:
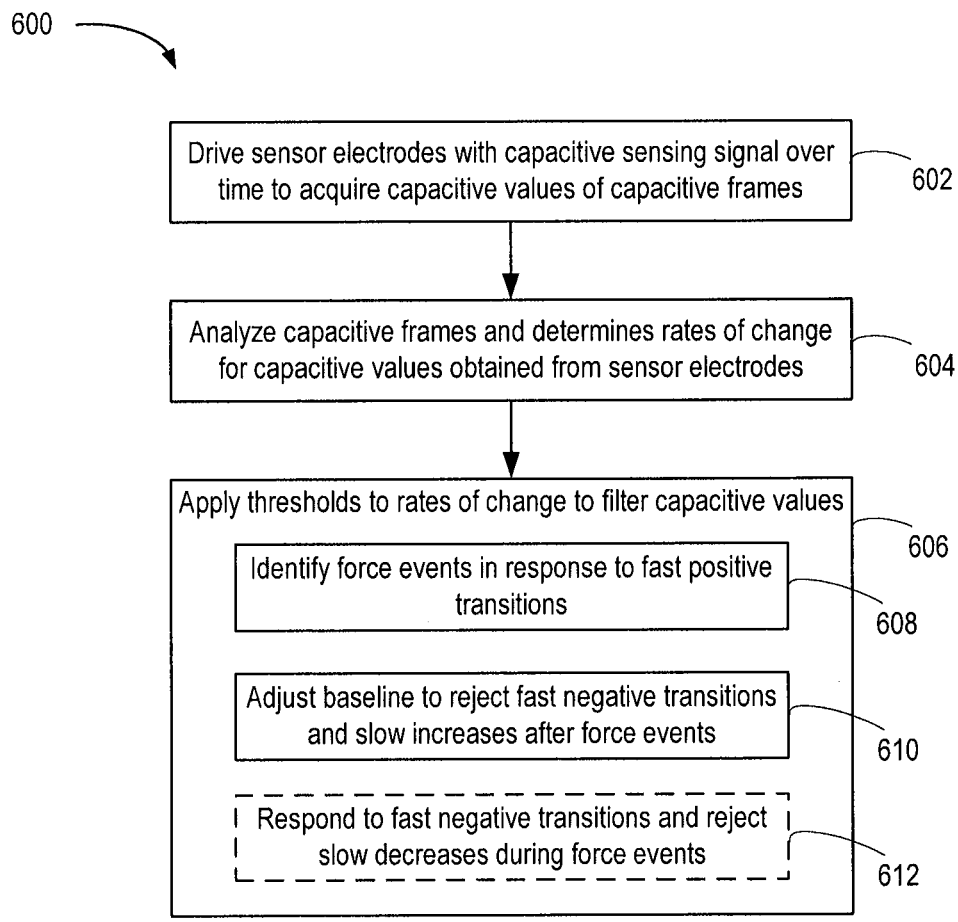
FIG. 6 is a flow diagram depicting a method of compensating for baseline artifacts in force sensing according to an embodiment.

FIG. 6 is a flow diagram depicting a method 600 of compensating for baseline artifacts in force sensing according to an embodiment. The method 600 can be performed by the processing system 110. The method 600 begins at step 602, where the sensor module 208 drives sensor electrodes with capacitive sensing signals over time to acquire capacitive values of capacitive frames. The sensor module 208 can employ either transcapacitive or absolute capacitive sensing using the techniques described above.

At step 604, the determination module 220 uses the filter 230 to analyzes the capacitive frames and determines rates of change for capacitive values obtained from sensor electrodes. The filter 230 can differentiate the resulting signals obtained from the sensor electrodes to determine the rates of change.

At step 606, the determination module 220 uses the filter 230 to apply thresholds to the rates of change to filter the capacitive values. The filter 230 identifies force events in response to fast positive transitions in the response (step 608). The filter 230 can operate independently on the response from each sensor electrode or on a combined response from multiple sensor electrodes. For example, the filter 230 can include a threshold time and/or threshold magnitude to designate transitions as fast positive transitions. The fast positive transitions are indicative of force events. The filter 230 can also apply a threshold number of sensor electrodes to determine if a force event occurred.

The filter 230 adjusts a baseline to reject fast negative transitions and slow increases in the response after each force event. The filter 230 can operate independently on the response from each sensor electrode or on a combined response from multiple sensor electrodes. For example, the filter 230 can include a threshold time and/or threshold magnitude to designate transitions as fast negative transitions. The filter 230 can include a threshold time and/or threshold magnitude to designate transitions as slow increases. The fast negative transitions and slow increases are indicative of mechanical relaxation after a force event. The filter 230 adjusts the baseline to compensate for the mechanical relaxation.

In an embodiment, the filter 230 responds to fast negative transitions and rejects slow decreases during force events (step 612). Fast negative transitions during a force event are indicative of a double force event (e.g., a quick double press). Slow decreases during a force event can occur when constant pressure is applied. Rejection of slow decreases in response avoids false detection of force events.

FIG. 5 shows a graph 501 illustrating an example filtered response measured from the sensor electrode pattern 250 in response to three force events. The filtered response can be measured from a single sensor electrode or be some combination of measurements from multiple sensor electrodes. The graph 501 includes a Y-axis representing a change in capacitance, and an X-axis representing time. As shown, the quiescent level of the filtered response remains constant from one force event to the next. The increasing magnitude of the force events becomes apparent in the filtered response shown in the graph 501 as opposed to the unfiltered response shown the graph 500.

Figure 7:
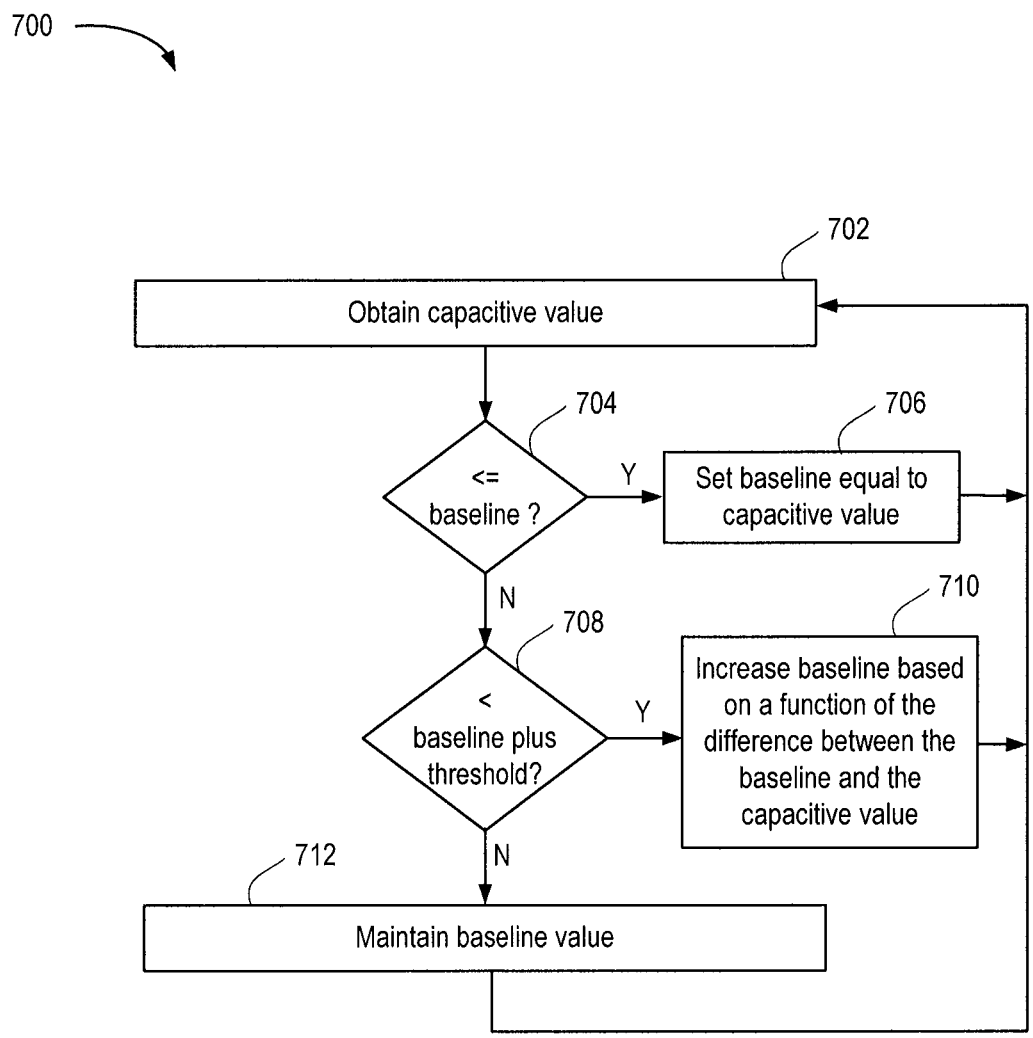
FIG. 7 is a flow diagram depicting a method of filtering capacitive values of a response signal according to an embodiment.

FIG. 7 is a flow diagram depicting a method 700 of filtering capacitive values of a response signal according to an embodiment. The method 700 can be implemented using a leaky-minimum detector within the filter 230 of the determination module 220. The method 700 begins at step 702, where the filter 230 obtains a capacitive value. At step 702, the filter determines whether the capacitive value is less than or equal to a baseline value. If so, the method 700 proceeds to step 706, where the filter 230 sets the baseline equal to the capacitive value. If the capacitive value greater than the baseline, the method 700 proceeds to step 708. At step 708, the filter 230 determines whether the capacitive value is less than the baseline plus a threshold value. If so, the method 700 proceeds to step 710, where the filter 230 increases the baseline based on a function of the difference between the baseline and the capacitive value. If the capacitive value greater than the baseline plus the threshold, the method 700 proceeds to step 712, where the filter 230 maintains the baseline value.

The filter 230 can perform the method 700 for each channel (e.g., on the resulting signal from each sensor electrode). The filter 230 can perform the method 700 for each capacitive frame obtained from the sensor module 208. At steps 706 and 710, the filter 230 adjusts the baseline to reject fast negative transitions and slow increases after the occurrence of a force event. During a force event, the filter 230 maintains the value of the baseline (step 712). Example pseudocode for the method 700 is shown below:

```
for (i = 1; i < Nf; i++)
    if (s[i] <= m[i])
        m[i] = s[i];
    else if (s[i] < m[i] + threshold)
        m[i] = m[i] + k * (s[i] - m[i]);
    end
end
``` where $s[i]$ is the capacitive value from the ith electrode, $m[i]$ is the baseline value for the ith electrode, $Nf$ is the number of sensor electrodes, and $k$ is a creep rate. In this example, the function used in step 710 is $k$ times the difference between the capacitive value and the previous value of the baseline. The algorithm is performed for each capacitive frame.

Figure 8:
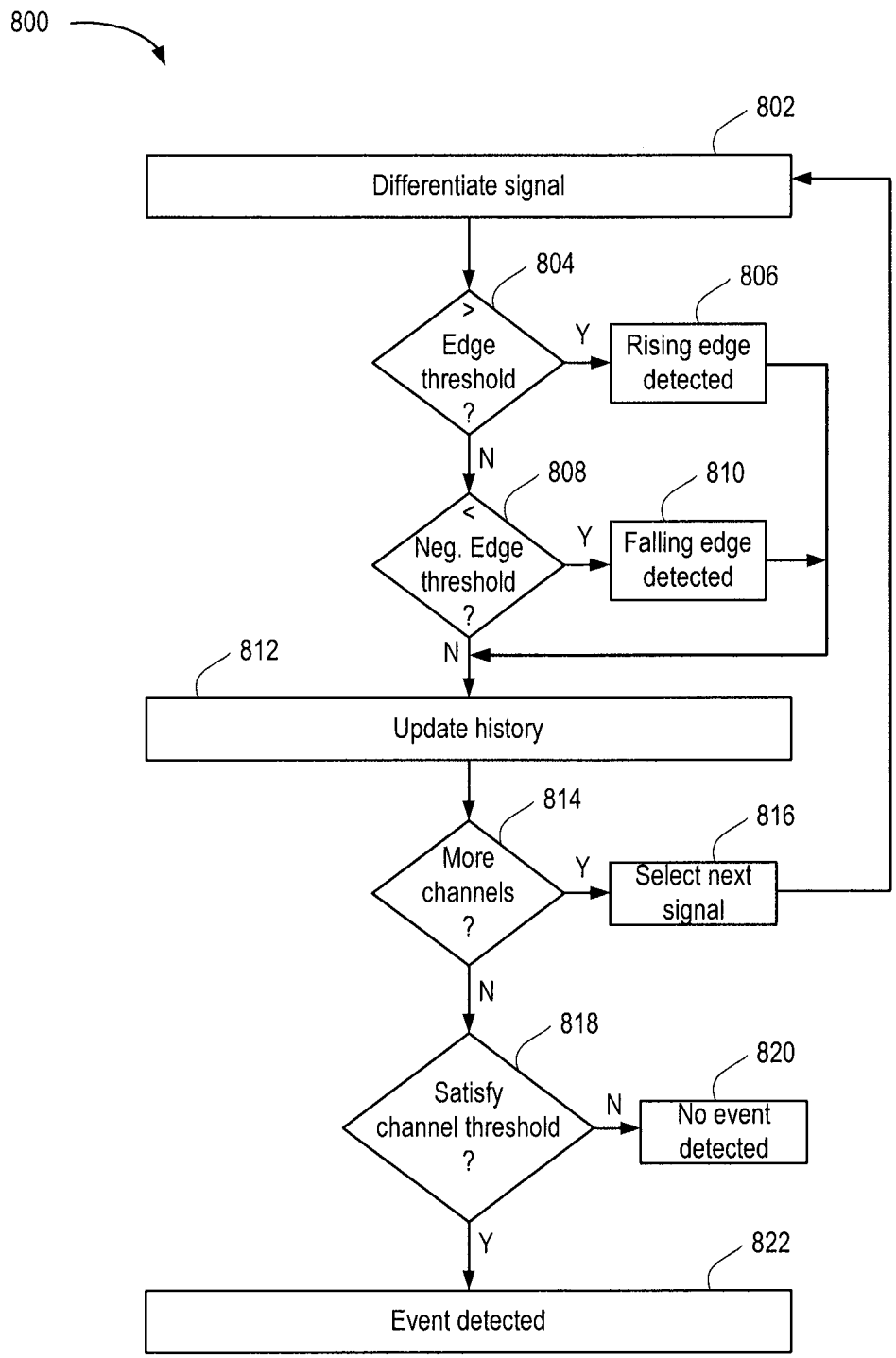
FIG. 8 is a flow diagram depicting a method of detecting a force event according to an embodiment.

FIG. 8 is a flow diagram depicting a method 800 of detecting a force event according to an embodiment. The method 800 can be performed by the determination module 220. The method 800 begins at step 802, where the determination module 220 differentiates a resulting signal from a sensor electrode. At step 804, the determination module determines whether the derivative is greater than an edge threshold. If so, the method 800 proceeds to step 806, where the determination module 220 determines that the rising edge of a force event has been detected. Otherwise, the method 800 proceeds to step 808. At step 808, the determination module 220 determines whether the derivative is less than a negative edge threshold. If so, the method 800 proceeds to step 810, where the determination module 220 determines that a falling edge of a force event has been detected. Otherwise, the method 800 proceeds to step 812. At step 812, the determination module 220 updates the history used to determine the derivative at step 802.

At step 814, the determination module 220 determines whether additional channels need to be process for the capacitive frame. If so, the method 800 proceeds to step 816, where the determination module 220 selects the next signal. The method 800 returns to step 802 and repeats. If there are no more channels to be processed for this capacitive frame, the method 800 proceeds to step 818. At step 818, the determination module 220 determines whether a force event has been detected on a threshold number of channels. If not, the method 800 proceeds to step 820, where the determination module 220 indicates that no force event was detected. Otherwise, the method 800 proceeds to step 822, where the determination module indicates that a force event has been detected.

The determination module 220 can perform the method 800 for each capacitive frame to detect the occurrence of force events. The determination module 220 can then apply the signals to the filter 230 as described above. Example pseudocode for the method 800 is described below:

```
for (i = 1; i < Nf; i++)
    d[i] = s[i] - h[i];   % differentiate the signal
    if (d[i] > edge_threshold)
        e[i] = 1;         % rising edge detected
    else if (d[i] < -1 * edge_threshold)
        e[i] = 0; % falling edge detected
    end
    h[i] = s[i]           % update history
end
w = (sum(e) >= ceil(Nf/2))    % an event is detected if on more
                              % than 50% of the channels
``` where $s[i]$ is capacitive value from the ith electrode, $h[i]$ is the history (previous value) for the ith electrode, $e[i]$ is a Boolean indicating presence or absence of a force event for the ith electrode, and $w$ is a Boolean indicating presence or absence of a force event for the sensor pattern as a whole. In the example, the channel threshold is 50%, but in general the channel threshold can have other values. The algorithm is performed for each capacitive frame.

Figure 9:
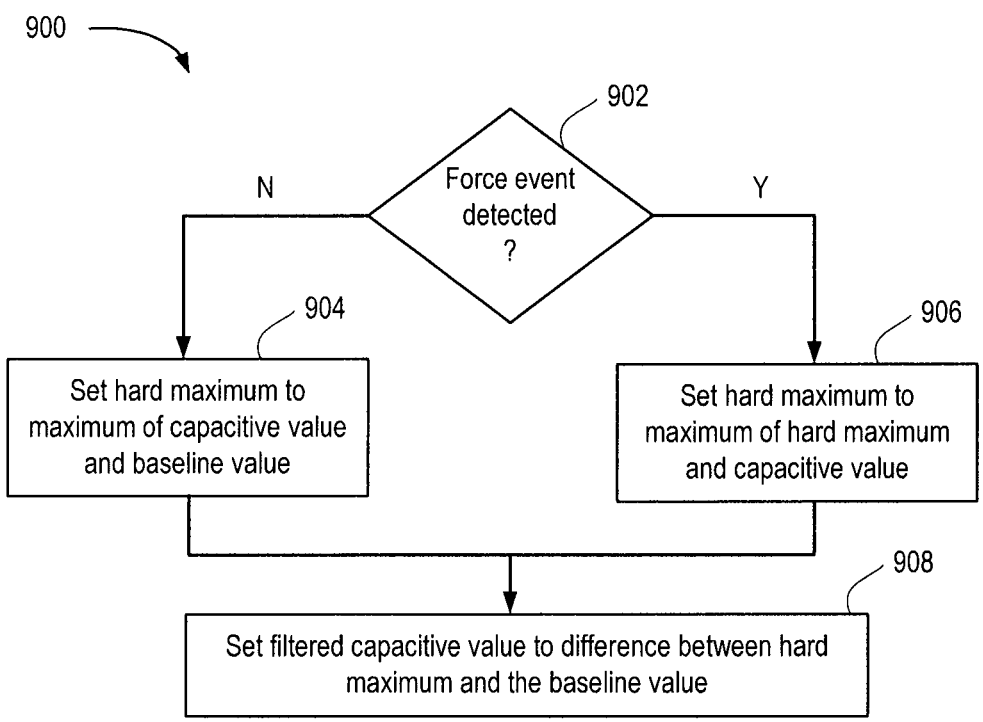
FIG. 9 is a flow diagram depicting a method of filtering capacitive values of a response signal according to an embodiment.

FIG. 9 is a flow diagram depicting a method 900 of filtering capacitive values of a response signal according to an embodiment. The method 900 can be implemented within the filter 230 of the determination module 220. The method 900 begins at step 902, where the filter 230 determines whether a force event has been detected. For example, the filter 230 can obtain an indication of a force event from the determination module 220 as determined above in FIG. 8. If no force event has been detected, the method 900 proceeds to step 904. At step 904, the filter 230 sets a hard maximum to the maximum of the capacitive value and the baseline value. If a force event has been detected, the method 900 proceeds to step 906. At step 906, the filter 230 sets the hard maximum to the maximum of the hard maximum and the capacitive value. At step 908, the filter 230 sets the filtered capacitive value to the difference between the hard maximum and the baseline value.

The filter 230 can perform the method 900 for each channel (e.g., on the resulting signal from each sensor electrode). The filter 230 can perform the method 900 for each capacitive frame obtained from the sensor module 208. The filter 230 can perform the method 900 to reject slow decreases in the signal during a force event. Example pseudocode for the method 900 is shown below:

```
for (i = 1; i < Nf; i++)
    if (w > 0)
        v[i] = max(v[i], s[i]); % reject slow decreases
                                % during a force event
    else
        v[i] = max(s[i], m[i]);
    end
    c[i] = v[i] - m[i]
``` where $s[i]$ is capacitive value from the ith electrode, $w$ is a Boolean indicating presence or absence of a force event for the sensor pattern as a whole, v[i] is the hard maximum for the ith electrode, and c[i] is the filtered value for the ith electrode. The algorithm is performed for each capacitive frame.

The embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

In view of the foregoing, the scope of the present disclosure is determined by the claims that follow.

We claim:

1. A capacitive input device, comprising:
    sensor circuitry configured to drive a plurality of sensor electrodes with capacitive sensing signals over time to acquire capacitive values of a plurality of capacitive frames; and
    a processing system, coupled to the sensor circuitry, configured to:
        analyze a first capacitive frame of the plurality of capacitive frames to identify a force event based on whether a first capacitive value for the first capacitive frame exceeds a baseline value;
        in response to determining that the first capacitive value does not exceed the baseline value, set the baseline value equal to the first capacitive value;
        analyze a second capacitive frame of the plurality of capacitive frames acquired after the force event to determine whether a second capacitive value for the second capacitive frame exceeds the first capacitive value;
        in response to determining that the second capacitive value exceeds the first capacitive value, determine whether a difference between the first capacitive value and the second capacitive value is less than a threshold;
        in response to determining that the difference between the first capacitive value and the second capacitive value is less than the threshold, adjust the baseline value based on a function of the difference between the first capacitive value and the second capacitive value; and
        determine force information about an input object in contact with the capacitive input device based at least in part on the plurality of capacitive frames.

2. The capacitive input device of claim 1, wherein the processing system is further configured to analyze the first capacitive frame to identify the force event based on rates of change for a plurality of capacitive values acquired from a threshold number of the plurality of sensor electrodes.

3. The capacitive input device of claim 1, wherein the processing system is further configured to reject the second capacitive value if the second capacitive value is less than the baseline value.

4. The capacitive input device of claim 1, wherein the processing system is further configured to reject at least one of the first and second capacitive values by setting the baseline value to a negative capacitive value.

5. The capacitive input device of claim 1, wherein the processing system is further configured to:
    analyze a third capacitive frame of the plurality of capacitive frames acquired during the force event; and
    reject a decrease in a third capacitive value of the third capacitive frame.

6. The capacitive input device of claim 5, wherein rejecting the decrease in the third capacitive value comprises increasing the third capacitive value to a maximum capacitive value acquired during the force event.

7. An input device, comprising:
    a plurality of sensor electrodes disposed in a sensing region;
    sensor circuitry configured to drive the plurality of sensor electrodes with capacitive sensing signals over time to acquire capacitive values of a plurality of capacitive frames; and
    a processing system, coupled to the sensor circuitry, configured to:
        analyze a first capacitive frame of the plurality of capacitive frames to identify a force event based on whether a first capacitive value for the first capacitive frame exceeds a baseline value;
        in response to determining that the first capacitive value does not exceed the baseline value, set the baseline value equal to the first capacitive value;
        analyze a second capacitive frame of the plurality of capacitive frames acquired after the force event to determine whether a second capacitive value for the second capacitive frame exceeds the first capacitive value;
        in response to determining that the second capacitive value exceeds the first capacitive value, determine whether a difference between the first capacitive value and the second capacitive value is less than a threshold;
        in response to determining that the difference between the first capacitive value and the second capacitive value is less than the threshold, adjust the baseline value based on a function of the difference between the first capacitive value and the second capacitive value; and
        determine force information about an input object in contact with the input device based at least in part on the plurality of capacitive frames.

8. The input device of claim 7, wherein the processing system is further configured to analyze the first capacitive frame to identify the force event based on rates of change for a plurality of capacitive values acquired from a threshold number of the plurality of sensor electrodes.

9. The input device of claim 7, wherein the processing system is further configured to reject the second capacitive value if the second capacitive value is less than the baseline value.

10. The input device of claim 9, wherein the processing system is further configured to reject at least one of the first and second capacitive values by setting the baseline value to a negative capacitive value.

11. The input device of claim 7, wherein the processing system is further configured to:
    analyze a third capacitive frame of the plurality of capacitive frames acquired during the force event; and
    reject a decrease in a third capacitive value of the third capacitive frame.

12. The input device of claim 11, wherein rejecting the decrease in the third capacitive value comprises increasing the third capacitive value to a maximum capacitive value acquired during the force event.

13. A method of capacitive sensing, comprising:

driving a plurality of sensor electrodes with capacitive sensing signals over time to acquire capacitive values of a plurality of capacitive frames;

analyzing a first capacitive frame of the plurality of capacitive frames to identify a force event based on whether a first capacitive value for the first capacitive frame exceeds a baseline value;

in response to determining that the first capacitive value does not exceed the baseline value, setting the baseline value equal to the first capacitive value;

analyzing a second capacitive frame of the plurality of capacitive frames acquired after the force event to determine whether a second capacitive value for the second capacitive frame exceeds the first capacitive value;

in response to determining that the second capacitive value exceeds the first capacitive value, determining whether a difference between the first capacitive value and the second capacitive value is less than a threshold;

in response to determining that the difference between the first capacitive value and the second capacitive value is less than the threshold, adjusting the baseline value based on a function of the difference between the first capacitive value and the second capacitive value; and determining force information about an input object in contact with a capacitive input device based at least in part on the plurality of capacitive frames.

14. The method of claim 13, further comprising analyzing the first capacitive frame to identify the force event based on rates of change for a plurality of capacitive values acquired from a threshold number of the plurality of sensor electrodes.

15. The method of claim 13, further comprising rejecting the second capacitive value if the second capacitive value is less than the baseline value.

16. The method of claim 13, further comprising:

analyzing a third capacitive frame of the plurality of capacitive frames acquired during the force event; and rejecting a decrease in a third capacitive value of the third capacitive frame.

17. The method of claim 16, wherein rejecting the decrease in the third capacitive value comprises increasing the third capacitive value to a maximum capacitive value acquired during the force event.

* * * * *